UNITED STATES PATENT OFFICE.

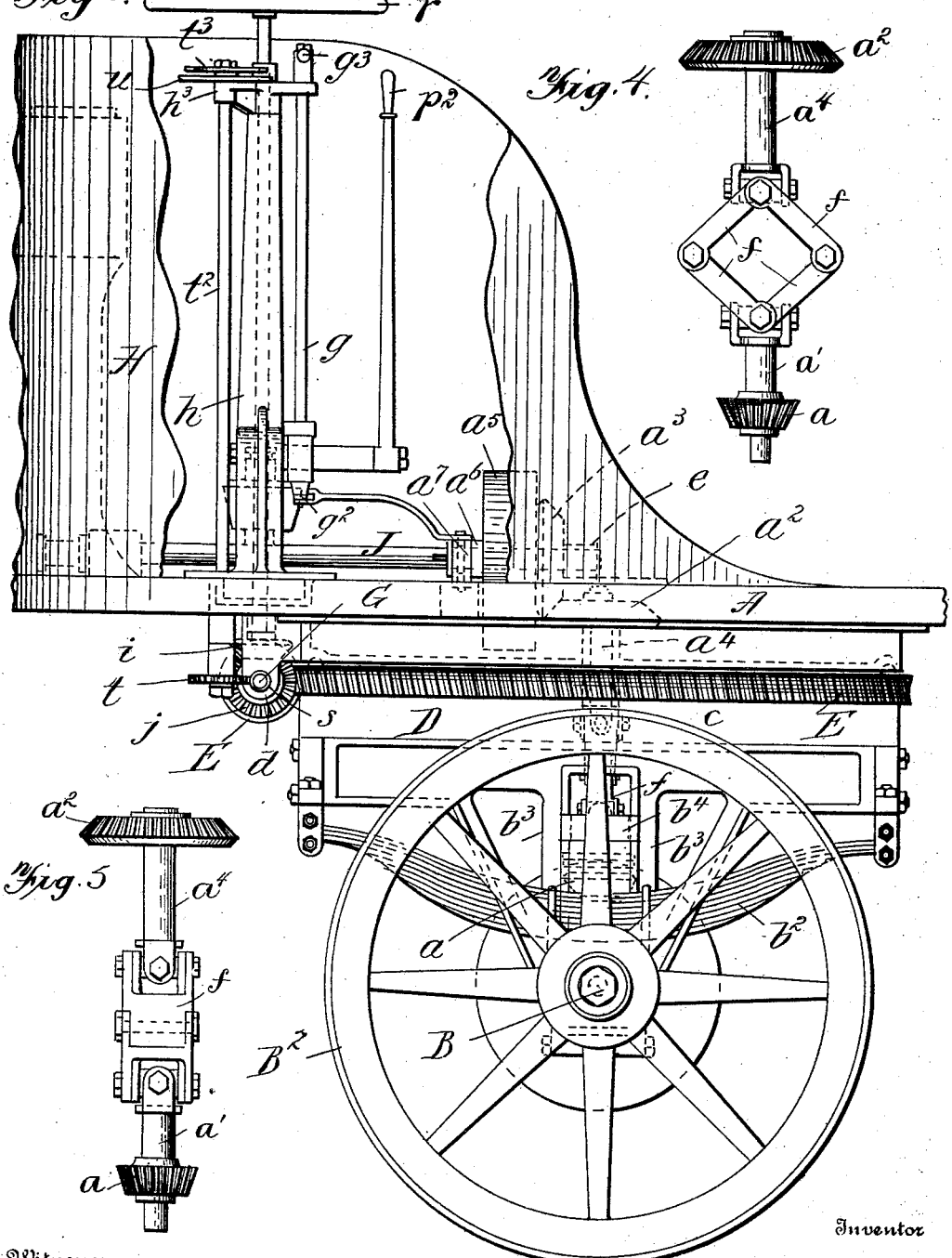

JAMES FRANK DURYEA, OF SPRINGFIELD, MASSACHUSETTS.

STEERING MECHANISM FOR VEHICLES.

SPECIFICATION forming part of Letters Patent No. 714,878, dated December 2, 1902.

Application filed May 10, 1900. Serial No. 16,241. (No model.)

*To all whom it may concern:*

Be it known that I, JAMES FRANK DURYEA, a citizen of the United States of America, and a resident of Springfield, in the county of Hampden and State of Massachusetts, have invented certain new and useful Improvements in Steering Mechanism for Vehicles, of which the following is a full, clear, and exact description.

This invention relates to improvements in motor-vehicles or automobiles, and more particularly to the class of such vehicles wherein the front wheels are both the driven and the steering wheels; and the invention more especially pertains to the mechanisms and controlling appliances whereby the motor may be made available for the propulsion of the vehicle through the front steering-wheels, whereby the motor may be employed to swing the steering-wheels to steer, whereby the motor may be simultaneously caused to both drive and steer, and whereby the motor may only drive the steering-wheels, the steering being operated manually.

The improved mechanism is especially useful on large and heavy motor wagons or trucks in which, especially at the time of starting the same, considerable power is necessary to change the relative position of the wheels under the body.

Another object of the invention is to insure that in the operation of the steering mechanism when the connections for changing the positions of the wheels toward one side are in engagement the connections for reversely changing the positions of the wheels must be necessarily out of engagement.

Another object of the invention is to provide an indicator observable at the place occupied by the rider or person in control of the motor-wagon for enabling him to know whether the steering-wheels range straight with the length of the vehicle or are turned to either side, this being especially advantageous at the time of starting the vehicle, which may have been left with the front wheels considerably deflected toward either side of the wagon.

The invention consists in combinations and arrangements of mechanisms and appliances and in constructions and combinations of parts, all substantially as hereinafter fully described, and set forth in the claims.

Reference is to be had to the accompanying drawings, in which the views show the forward portion of the motor-vehicle having an engine or motor mounted thereon and showing the forward driving and steering wheels and the means for controlling the driving and steering, and in said drawings—

Figure 1:
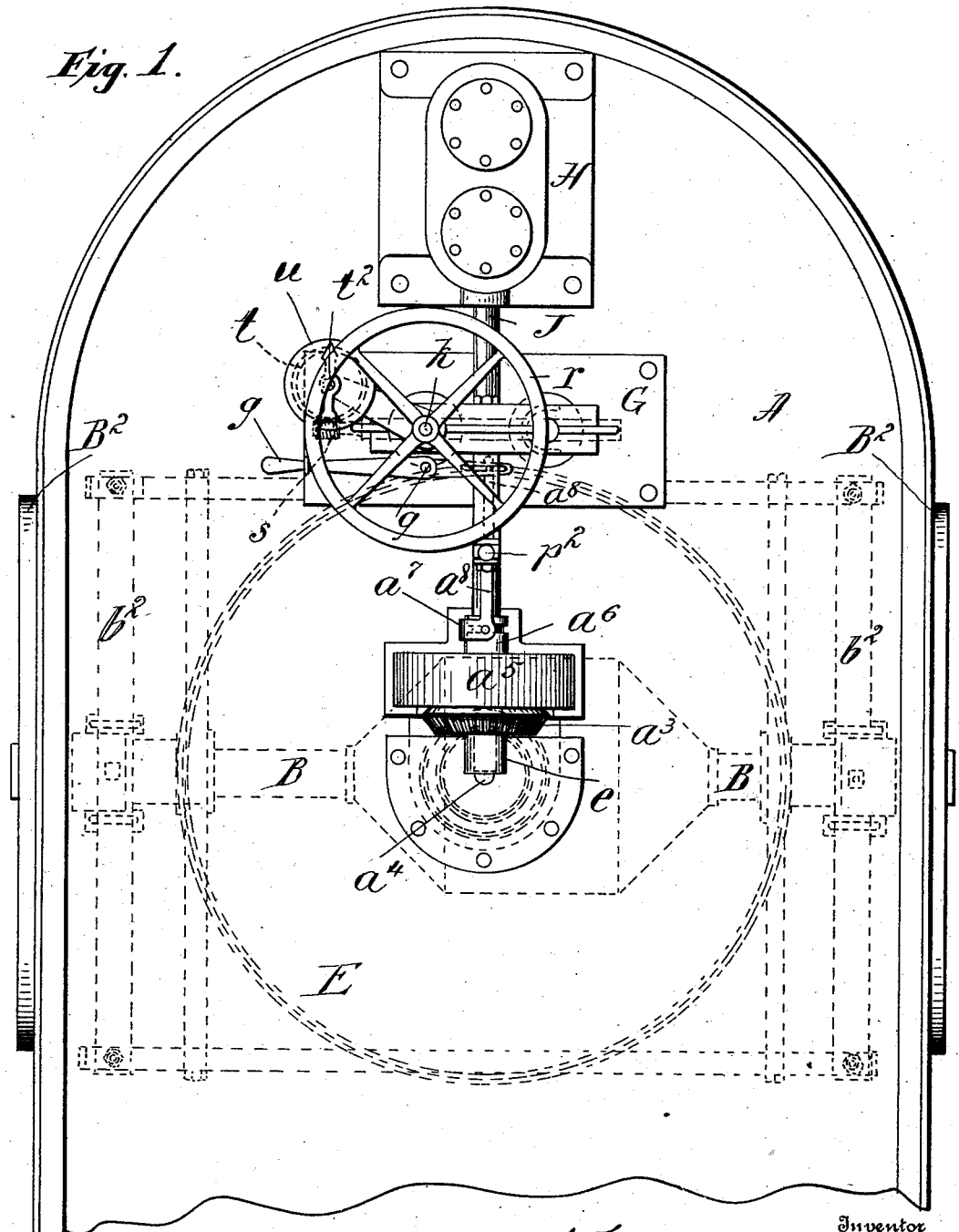
Figure 2:
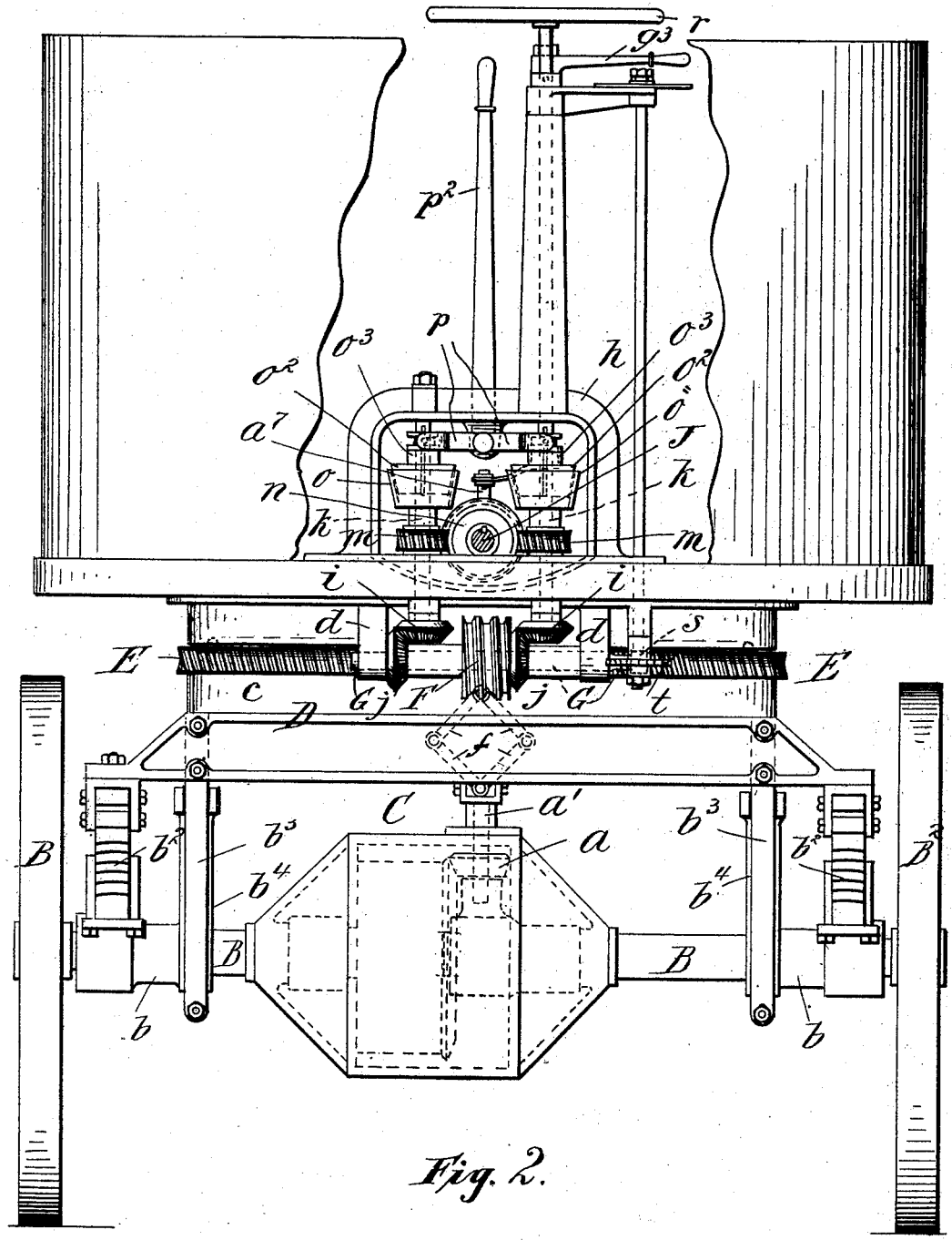

Figure 1 is a plan view. Fig. 2 is a front view with parts broken away and the engine-shaft being seen in cross-section as taken next to the rear of the engine. Fig. 3 is a side elevation. Figs. 4 and 5 are views in detail at right angles to each other of articulated driving connections hereinafter particularly referred to.

In the drawings, A represents the forward portion of the body of the motor-wagon or automobile vehicle, beneath which is the divided axle B for the forward wheels $B^2 B^2$, which are in this mechanism both the driving and the steering wheels, and, as common in the divided axles for the driving-wheels of motor-vehicles, the two adjacent parts of the axle are equipped with the compensating gearing indicated within the casing C, and comprised in which compensating gearing is the bevel gear-wheel A, to which continuous rotary motion may be imparted through driving connections from the engine thereto to secure the propulsion of the vehicle.

Above the divided axle is a truck-frame D, there being interposed between the truck-frame and the journals $b\ b$ for the axles the spring $b^2$, and the truck-frame has the depending pedestals $b^3$, in which guide-blocks or parts $b^4$ of the axle-journals have relatively thereto a vertical play. The platform-like upper part $c$ of the truck-frame supports thereon the large worm-wheel E, meshing with which is the worm F, the same being carried as a fixed part on a shaft G, which is horizontally and transversely mounted in the hangers or brackets $d\ d$, which are secured to and depend below the bottom of the wagon-body A.

H indicates the engine or motor, supported at extreme forward part of the wagon, the main or driving shaft J of the engine extending longitudinally along about the central line of the wagon near the wagon-bottom, and its rear end is mounted in the journal-lug $e$, rising suitably above the bottom of the wagon-body. On the rear end portion of the shaft is a bevel gear-wheel $a^3$, which rotates in a vertical plane and in mesh with which is a bevel gear-wheel $a^2$, which is mounted on the upper end of a vertical shaft $a^4$, which shaft is shackled to the shaft-section $a'$ of the bevel gear-wheel $a$, which is in driving connection with the axle-sections B B.

For the reason that the gear-wheel and shaft section $a^2$ $a^4$ have vertical movements relatively to the wheels and axle corresponding to the movements of the spring-supported wagon-body and the gear-wheel $a$ and its shaft-section $a'$ are practically or relatively immovable the shaft-sections $a'$ and $a^4$ are united by the double toggles $f$, which are articulated in such manner that the endwise contraction of the two shaft-sections is readily permitted, but so that the turning of the upper shaft-section insures necessarily the turning of the lower shaft-section and the gear thereon.

The gear $a^3$ is understood as being loose on the engine-shaft J, and this gear-wheel $a^3$ has as one therewith the loose clutch-wheel $a^5$, also loose on the engine-shaft, and with the grooved hub $a^6$, which is splined to slide on the shaft J and which operates the shoes of the clutch, which may be of the most common and well-known type, the yoke $a^7$ is engaged, said yoke having the extension or connecting-rod $a^8$, with which is connected or engaged an arm or lever $g^2$, which is carried at the lower end of a vertical shaft or post $g$, which at its upper end is provided with the operating-lever handle $g^3$. The said shaft $g$ or rotatable post is mounted in its vertical position in suitable bearings or brackets of the supporting structure, (indicated in a general way by the letter $h$.)

Of course it is apparent that by properly swinging the handle-lever $g^3$ in a horizontal plane the engine will be in or out of driving connection with the front-wheel axle.

Mounted on the elongated hubs of the aforementioned worm F are bevel gear-wheels $j$ $j$ for rotations in vertical planes as one with the shaft G, and both gear-wheels $i$ $i$ are in mesh with the said gears $j$ $j$, the same being fixed at the lower ends of vertical shafts $k$ $k$, which extend from the positions of said gears $i$ below the wagon-body upwardly through the latter and have suitable bearings both near their lower ends and also in the arch-like part of the supporting frame or casting $h$.

Loose on the shafts $k$ $k$ are worm-wheels $m$ $m$, intermediate between and in engagement with both of which is a worm $n$, (seen in Fig. 2,) said worm being fast on the engine-shaft J. Formed with or affixed to move in unison with the normally free-running worm-wheels $m$ $m$ are annular clutch members $o$ $o$, for coaction with which are arranged the correspondingly-provided clutch members $o^2$ $o^2$, which are carried by the rotatable sleeves $o^3$, which slide vertically on the shafts $k$, but have spline engagements therewith, whereby they are rotated in unison with said shafts.

$p$ represents a two-armed lever, (best seen in Fig. 2,) the same being intermediately pivoted beneath the upper part of the arch-like supporting-casting $h$ and between the said shafts $k$ $k$, and the extremities of the arms $p$ are formed into yokes which engage the clutch-sleeves of the parts $o^3$, and the extended intermediate journal-stud or rock-shaft, of which the said lever-arms $p$ are extensions, has affixed thereto the upwardly-extending operating-lever handle $p^2$. It will be understood that for the reason that the worm-wheels $m$ $m$ are, as shown in Fig. 2, arranged on opposite sides of the worm $n$ the said worm-wheels will be rotated by the worm in reversed directions, and so will be the shafts $k$ $k$, one after the other, if placed in clutch with the respectively-provided worm-wheel, and rotational movement of either shaft imparted thereto from the power-driven worm $n$ when such shaft is in clutch with its worm-wheel will correspondingly turn the shaft G, which is below the wagon-body and on which is the worm F, so that the rotational movement of said worm F will cause the partial turning of the large worm-wheel E and the front running-gear on which said large worm-wheel is an equipment. Thus it will be seen that the steering of the vehicle either to the right or to the left may be accomplished, using the engine-power of the vehicle as the force for causing the deflection of the front-wheel axle and body under the control of the rider, who has merely to manipulate the clutch-operating lever $p^2$.

In addition to the capability for the power-steering, as just explained, one of the shafts $k$ (it is immaterial which) may be upwardly extended, as seen in the drawings, and provided with a hand-wheel $r$, by means of which to operate the shaft on which it is mounted manually. Therefore by leaving the lever $p^2$ in its upright position, so that both of the shafts $k$ $k$ are out of connection with the engine-shaft, the entire steering may be performed by turning the hand-wheel in either direction, as required.

For the reason that in many types of motor-vehicles in which the present steering mechanism is applicable the steering-wheels will not be visible to the person in control of the vehicle I make provision whereby the position of the wheels is indicated, the same consisting of a small worm $s$ on the end of the shaft G, with which is in mesh a worm-wheel $t$, the same being supported at the lower end of a vertical shaft $t^2$, the upper end of which is journaled through a bracket $h^3$, supported by the casting $h$ at an upper extension thereof, and also supported movably on this bracket is a dial-plate $u$, while the upper end of the shaft has fast thereto an index or pointer $t^3$. The dial-plate may have graduations and indicating characters as means for increased convenience of the person in charge of the running of the motor-vehicle.

The worm-wheel E, provided as an equipment to the steering-axle, and with which worm-wheel the axle must necessarily turn in unison, and the worm on the vehicle-body having the capability of being turned by the application of intelligently-directed power from above the body constitute valuable features in the present invention for improvements in motor-wagons, more especially because the worm-wheel and worm constitute a lock against any force tending to turn or swing the axle, which may be directed by pressure or stress on or through the wheels and axle, while at the same time the movements for the proper steering may be most readily imparted through the appliances (either power or manually operated) for turning the worm.

Having thus described my invention, what I claim, and desire to secure by Letters Patent, is—

1. A vehicle having on its body a motor-driven shaft, a clutch-engaged gear-wheel to be driven by said motor-shaft, and a depending shaft-section, the axle for the forward wheels arranged under said depending shaft-section and a gear-wheel in driving connection with the axle having a rising shaft-section, means of engagement between said shaft-sections whereby they rotate in unison, but may have contracted and distended relations, journal-sleeves surrounding said axles, having upward extensions $b^4 b^4$, and supporting the springs, a part, D, supported by said springs having the pedestals depending over and embracing said journal-sleeve extensions, and on which part D the forward part of the vehicle-body rests, and between which said part and body there is relatively a swiveling movement and means provided and actuated on the body, and operating on the said part D, for turning same, substantially as described.

2. A vehicle having on its body a motor-driven shaft, a clutch-engaged gear-wheel, to be driven by said motor-shaft, and having a depending shaft-section, the part D, having the worm-wheel, E, below the body and relatively to which it turns about the axis of said shaft-section, and provided with the pedestals $b^3$, the axle having the journal-sleeves provided with the rising extensions $b^4$ engaging and adapted to play within, said pedestals, and having supported thereon the springs on which said part D is yieldingly mounted, a gear-wheel in rotatably-driving connection with the axle, having the upstanding shaft-section, double links jointed to the two said shaft-sections, a worm supported by the body, engaging said worm-wheel, and mechanism intervening between the motor-shaft and said worm connected with the worm and having clutching and unclutching connections with the motor-shaft, substantially as and for the purposes set forth.

3. In a motor-vehicle the combination with the forward axle, equipped with a worm-wheel, of the vehicle-body carrying a motor and provided with a worm in engagement with the worm-wheel, which worm has, to rotate in unison therewith, two gear-wheels, two shafts located at opposite sides of the motor-shaft, on which are gear-wheels meshing said two gears provided to the worm, a worm mounted on the motor-shaft, worm-wheels $m\,m$ loosely mounted on the said two shafts and engaging at opposite sides of the said motor-shaft worm, clutch members mounted on and constrained to turn with said two shafts, and adapted to be thrown into engagement with said worm-wheels $m\,m$, for the purpose set forth.

4. In a motor-vehicle, the combination with the forward axle, equipped with a worm-wheel, of the vehicle-body carrying a motor and provided with a worm, in engagement with the worm-wheel, which worm has, to rotate in unison therewith, two gear-wheels, two shafts located at opposite sides of the motor-shaft, on which are gear-wheels meshing said two gears provided to the worm, a worm mounted on the motor-shaft, worm-wheels $m\,m$ loosely mounted on the said two shafts and engaging at opposite sides of the said motor-shaft worm, clutch members mounted on and constrained to turn with said two shafts, and mechanism for controlling said clutches having united members engaging both thereof, whereby when one is in engagement with its adjacent worm-wheel $m$, the other clutch necessarily is placed out of engagement with the other worm-gear, substantially as described.

5. In a motor-vehicle the combination with the forward axle, equipped with a worm-wheel, of the vehicle-body carrying a motor and provided with a worm in engagement with the worm-wheel, which worm has, to rotate in unison therewith, two gear-wheels, two shafts located at opposite sides of the motor-shaft, on which are gear-wheels meshing said two gears provided to the worm, a worm mounted on the motor-shaft, worm-wheels $m$ $m$ loosely mounted on the said two shafts and engaging at opposite sides of the said motor-shaft worm, and having clutch members $o\,o$, clutch members $o^2\,o^2$ sliding on and turning with said two shafts, and having grooved extension-sleeves $o^3$, a handle-lever $p^2$ mounted for a rocking motion and leaving the double lever members $p\,p$ which engage said clutch-sleeves $o^3$, substantially as described.

6. The combination with the vehicle-body having the shaft provided with the worm F and the worm $s$, the front-wheel axle equipped with the worm-wheel E, with which the worm F is in engagement, means for causing the rotation of the said worm F in either direction, a shaft having a worm-wheel $t$ in engagement with worm $s$, and having an indicator, substantially as and for the purpose set forth.

7. In a motor-vehicle in combination, the front-wheel axle supporting the worm-wheel in unison with which the axle is constrained to turn or swing horizontally, the vehicle-body having the motor and its shaft mounted thereon, and provided with the gear-wheel $a^3$, a clutch for connecting and disconnecting said gear-wheel with and from the axle, and means for operating the clutch, the shaft G mounted on the body provided with the worm F and the bevel-gears $j\,j$, the shafts $k\,k$ mounted on the body at opposite sides of the motor-shaft, a worm $n$ on the motor-shaft, worm-wheels $m\,m$ loose on the shafts $k\,k$ having clutch members, clutch members turning with, but slidable along, said shafts $k$, coacting with the worm-wheel clutch members, means for manually operating the sliding clutch members simultaneously in opposite directions, and means for manually rotating one of said shafts $k$ in either direction, substantially as and for the purposes set forth.

8. In a motor-vehicle in combination, the front-wheel axle having the spring-supported truck-frame D provided with a worm-wheel E, and a vertical shaft-section $a'$ with a gear in driving connection with the axle, the vehicle-body having the shaft-section $a^4$ link-connected with shaft-section $a'$, the engine-shaft having the worm $n$, and the loose clutch-wheel $a^5$ geared to the shaft-section $a^4$, the clutch-sleeve turning with and movable along the engine-shaft, the lever $g^3$ and connections between same and the clutch-sleeve, the shaft G supported below the motor-body, having the worm E engaging said worm-wheel, and having the bevel gear-wheels $j\,j$, the vertical shafts $k\,k$ at opposite sides of the engine-shaft having the gear-wheels, $i\,i$, meshing the ones $j$ and having loose thereon the worm-wheels $m\,m$ both meshing said engine-shaft worm, and provided with clutch members the clutch-sleeves turning with and slidable along the shafts $k\,k$ coöperating with the worm-wheel clutch members, the two-armed lever $p$ and common operating handle-lever $p^2$ and a means for manually turning one of said shafts $k$, substantially as described.

Signed by me at Springfield, Massachusetts, in presence of two subscribing witnesses.

J. FRANK DURYEA.

Witnesses:
WM. S. BELLOWS,
NETTIE M. BELLOWS.